US000001533H

United States Statutory Invention Registration [19]

[11] Reg. Number: H1533

[45] Published: Jun. 4, 1996

Bowers et al.

[54] BELUGA WHALE OBJECT RECOVERY SYSTEM

[75] Inventors: Clark A. Bowers, San Diego; Donald Miller, DelMar, both of Calif.

[73] Assignee: The United States of America as represented by the Secretary of the Navy, Washington, D.C.

[21] Appl. No.: 788,599

[22] Filed: Aug. 19, 1985

[51] Int. Cl.[6] ..... A01K 29/00

[52] U.S. Cl. ..... 89/1.11; 119/174

[56] References Cited

U.S. PATENT DOCUMENTS

| | | | |
|---|---|---|---|
| 3,005,183 | 10/1961 | Mayes | 340/6 |
| 3,587,038 | 6/1971 | Massa | 340/6 R |
| 3,722,941 | 3/1973 | Seiple et al. | 294/66 R |
| 3,992,692 | 11/1976 | Filer | 340/5 R |
| 4,232,417 | 11/1980 | Miller et al. | 9/8 R |
| 4,335,682 | 6/1982 | Gonda et al. | 119/29 |

*Primary Examiner*—Michael J. Carrone

*Assistant Examiner*—Theresa M. Wesson

*Attorney, Agent, or Firm*—R. F. Beers; E. F. Johnston; Harvey Fendelman

[57] ABSTRACT

A method of recovering an underwater object wherein a beluga whale wears a backpack harness, beaches into a boat with beaching capabilities and is transported to an area of work. The beluga whale is trained to then follow small boats, carry attachment hardware using a bite plate connected to the hardware, carry tow lines and buoyancy modules from the surface, dive and then locate and deploy the attachment hardware onto the non-pingered target.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BELUGA WHALE OBJECT RECOVERY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

There are several ranges in the Pacific and Northwest where torpedoes are fired and recovered routinely. Computerized operations, tracking, and test facilities, control, monitor, and direct range activities at each site. Underwater sounds and surface craft activity are tightly controlled, which helps range operators assure successful torpedo firings. Sophisticated underwater hydrophone arrays are used to keep track of run and end-of-run positions of test weapons. Surface craft with directional underwater sound receivers are used to pinpoint the torpedo's location.

Large recovery craft capable of deploying a variety of tethered vehicles are vectored to recovery sites. Tracking data help provide information about the torpedo's condition such as whether it is floating, lying on the sea floor, or partially or fully buried. The recovery craft usually lowers the vehicle to assess torpedo status, to make the recovery, or to determine if another vehicle will be required to assist with recovery. Recovery operations are manpower intensive and can be extremely time consuming and costly.

Successful recoveries are a function of a number of factors independent of such obvious variables as sea state, weather, hardware, personnel, and support craft capability. For example, torpedoes are equipped with acoustic beacons (pingers), but if the pinger malfunctions, torpedo recovery is often impossible. Or, if the torpedo drops into a bad location, such as under cables, next to hydrophone arrays, or in crevices on the bottom, or floats in the water column, recovery operations become very difficult.

Improvements in recovery techniques and equipment, i.e. improvements that will cut costs, save time and reduce manpower are important to range operations.

The Navy has conducted research on several marine mammal systems which were devoted to solving or aiding recovery operations. It has been demonstrated in various projects that sea lions, dolphins, killer whales, and pilot whales can be trained to work in the open ocean and perform a variety of tasks. These animals have all learned to carry and attach devices to targets emitting acoustic signals.

Although the Navy projects have demonstrated a variety of recovery capabilities, information now available indicates that the project animals previously used may have operational limitations in cold and fresh water or in areas of low salinity or at deep diving depths in excess of 1,000 feet.

SUMMARY OF THE INVENTION

In accordance with the discoveries and invention of the method disclosed, the foregoing problems with underwater recovery operations are overcome as follows. Particularly, applicants have discovered that beluga whales have sonar and deep diving capabilities and that these animals can be trained to utilize these capabilities for recovery of pingered as well as non-pingered objects in water. More particularly, applicants have discovered and invented a system for providing a safe, rapid and economical means of marking and/or recovering acoustically active (pingered) and acoustically passive (non-pingered) objects from within a body of water and/or on the ocean floor. The beluga whale object recovery system has the advantages over other systems such as tethered remote controlled underwater vehicles and manned submersibles of simplicity, lack of requirement for large, expensive and sophisticated support equipment, rapid deployment capability, hardware attachment capability and also the ability to operate in strong currents and turbid waters.

The beluga whale recovery system of the present invention includes a trained beluga whale that performs the following behaviors. Upon command the trained beluga whale will beach itself onto a floating platform or modified boat. The beluga whale will allow itself to be transported on the platform or boat to the area of water to be searched. At the search area, the beluga whale is trained such that, while free swimming, it follows a small boat from its home base floating net pen or modified boat to the search area and then returns. Upon command, the beluga whale accepts a mouthpiece with associated attachment hardware. Utilizing its acoustic homing capabilities, it is trained to locate a pingered or non-pingered cylindrical object on the ocean floor or in the water column. It is then trained to dive down and attach the attachment hardware to the cylinder. The attachment hardware carries with it a lift line so that the underwater object may then be lifted via the lift line to the recovery boat.

OBJECTS OF THE INVENTION

Accordingly, it is the primary object of the present invention to disclose an underwater recovery method and system that is extremely simple and has no requirement for large, expensive and sophisticated support equipment.

It is a further object of the present invention to disclose an underwater recovery method that can be rapidly deployed and has the capability of operating in strong currents and turbid waters.

It is a concommitant object of the present invention to disclose an underwater recovery system using marine mammals that can be trained to locate non-pingered targets.

It is a still further object of the present invention to disclose an underwater recovery system that requires minimal support equipment and relatively few personnel for its operation.

It is another object of the present invention to disclose a beluga whale underwater recovery system that has the capability of recovering targets at relatively deep depths, e.g. 1300 feet.

Other objects, advantages and novel features of the invention will become apparent from the following detailed description of the invention when considered in conjunction with the accompanying drawings.

DESCRIPTION OF THE PREFERRED EMBODIMENT

In accordance with the present invention, it has been discovered that the behavior of beluga whales can be conditioned in incremental steps. Completed and reliable behaviors of these whales may be often chained together permitting long sequences of responses between reinforcements. Operant conditioning techniques are preferably used throughout the whale training program. During the conditioning process, bridging stimuli, which include a variety of visual and acoustic cues, may be used to indicate to the whales when food is coming or can be expected. The magnitude and type of reinforcement may vary depending on the difficulty of the task, the length of the response required, control or dependability requirements and the whale's willingness to perform. In the method of the present invention, punishment is not used but forced training methods may be utilized to control boat-following, premature diving, and foraging for fish during open water exercises. These forced training methods may include attaching highly buoyant floats to the animals to prevent or discourage them from diving when it is inappropriate to do so.

Figure 3:
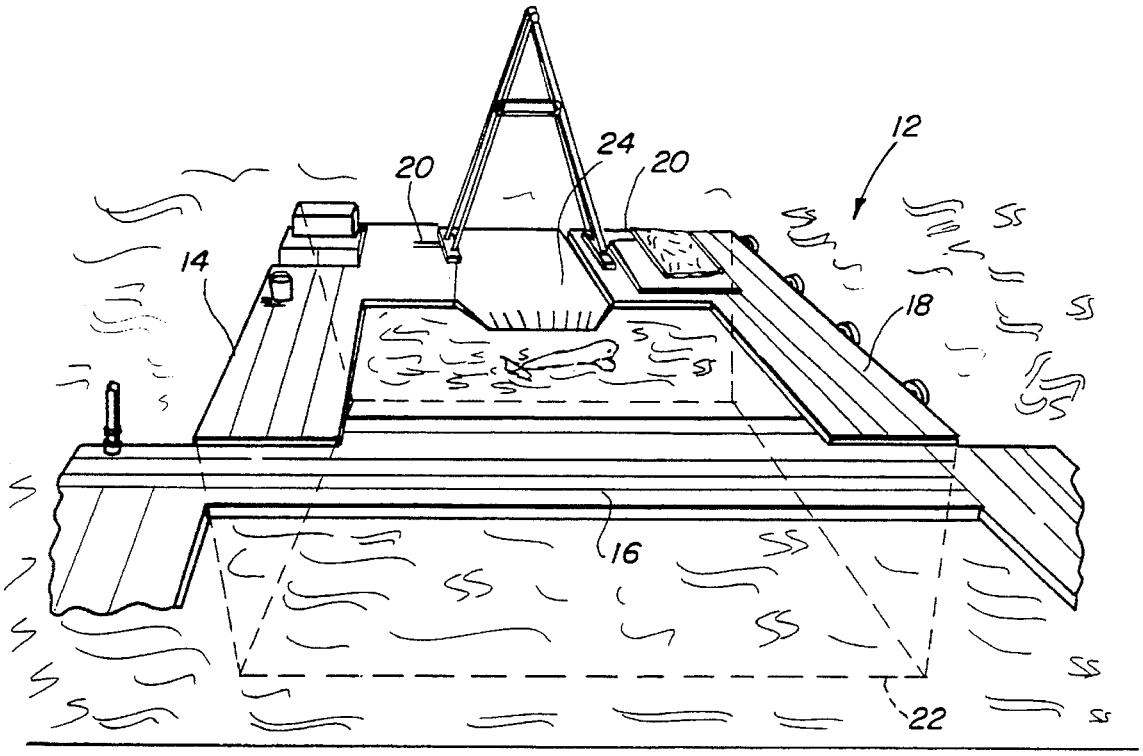
FIG. 3 is an isometric view of a floating net pen suitable for use in the training of beluga whales for the method of the present invention.

In the initial training stages of the whales in accordance with the present invention, the whales are trained to respond to cues and commands in closed off areas of water such that the cues and commands can later be used to control the animals in the open ocean. Thus, training may be conducted in floating pens and in large net enclosures. Referring to FIG. 3 there is illustrated a floating, beaching pen suitable for this purpose. The floating, beaching pen 12 may be generally constructed as is illustrated in FIG. 3 wherein it is shown that the pen includes walkways 14, 16, 18 and 20 connected by any suitable means (not shown) and sustained above the surface of the water by means of floatation drums (not shown) as is well known. The floating, beaching pen 12 may also include underwater net type cage 22 comprised of any suitable netting material and suspended from and attached to the walkways 14, 16, 18 and 20. The pen 12 may also include a beaching platform 24 for conditioning the beluga to beach himself upon command. The beaching platform 24 may be covered with a slick rubber type material such as Buna-N to facilitate the beaching of the beluga.

Figure 1:
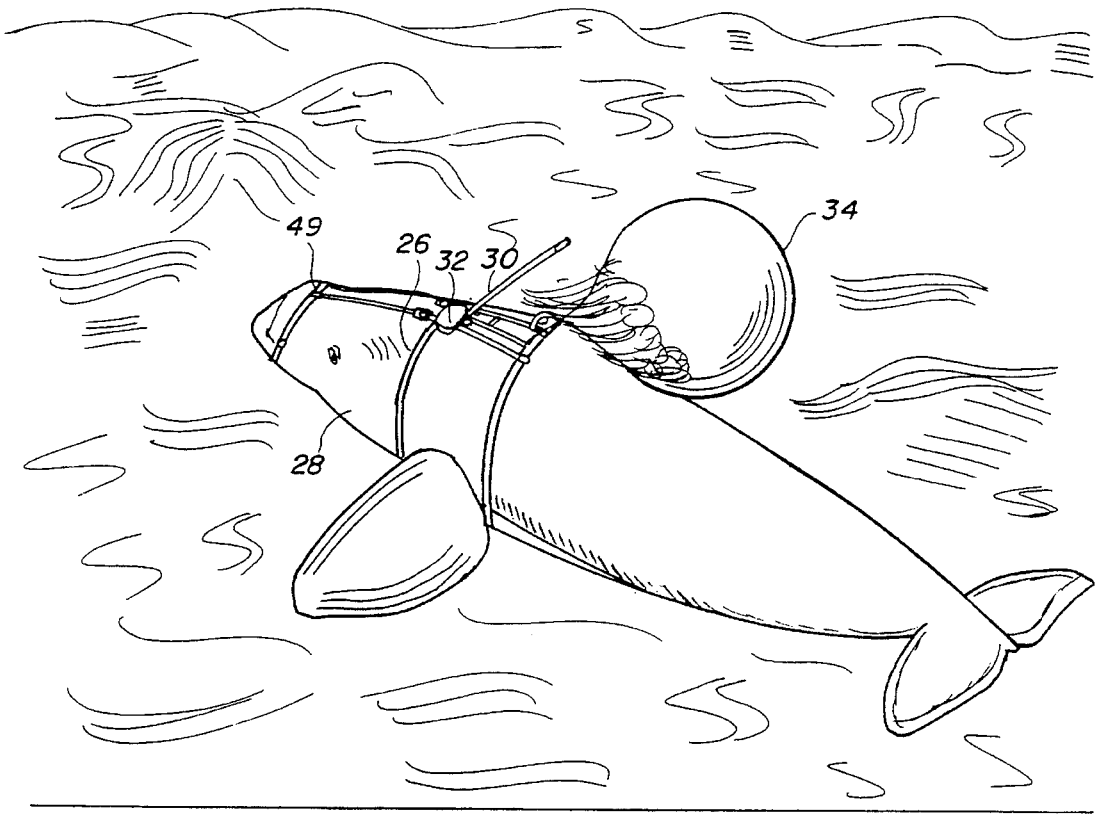
FIG. 1 is an isometric view of a backpack harness with transmitter suitable for tracking of beluga whales during training.

In order to track the animals while they are free swimming in the ocean, the beluga whales trained in accordance with the present invention are conditioned to wear a harness, backpack, and transmitter assembly as is illustrated in FIG. 1 wherein harness 26 is illustrated as attached to beluga 28 and includes backpack 30 and transmitter 32. As is also illustrated in FIG. 1, a float 34 may be attached to harness 26 in order to prevent the beluga whale from diving and foraging during the conditioning training. During the conditioning process, the beluga whales are also conditioned to swim through gates from one pen to another and then eventually into the open water. It has been discovered in the present invention that beluga whales are easily conditioned to swim through gates without the use of crowding techniques and that beluga whales have little or no aversion to overhead obstructions or shallow water.

Behavioral control of the beluga whales may initially be established by requiring the whales to touch acoustic devices such as recall pingers at gradually increasing distances. The pingers may then be associated with various tasks such as following boats, carrying and deploying hardware, beaching, and deep diving. These conditioned behaviors may be accomplished through operant conditioning.

Beaching is a process in which the whale slides out of the water onto a beaching platform slightly above the water surface such as beaching platform 24 illustrated in FIG. 3. The beaching behavior permits the whales to be moved from place to place and to be weighed and examined routinely.

In order to condition the beluga whales for open-water control, before they are released into an area of open water, each whale undergoes large-area control training. In this training, a section of netting may be used in a large area of water to demonstrate that boat following and recall behaviors have properly been conditioned into the animal and that the animals have become reliable in this regard.

Figure 6:
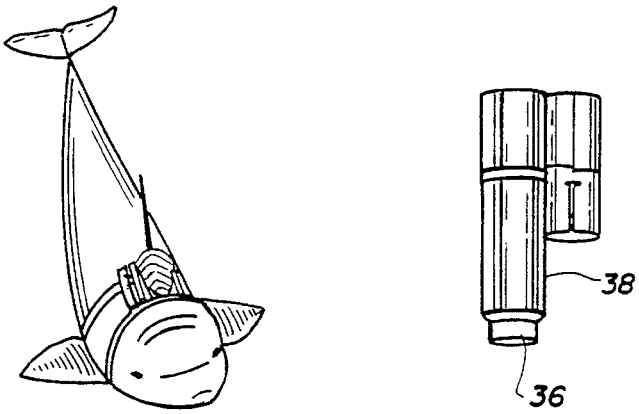
FIG. 6 is a schematic diagram of a beluga whale approaching a pingered object used for training.

Conditioned deep-diving capabilities may be accomplished in accordance with the present invention by daily training over a period of several months to develop these abilities. Each day the animal is harnessed as illustrated in FIG. 1 and boat-followed to the work area. They are trained to station themselves next to the work boat and ]then on command dive to a pinger suspended by a cable from a surface craft. The pinger may emit a 12-kHz acoustic tone in order to assist the whale in guiding itself to it. Upon arrival, the whale is conditioned to push a button on the pinger such-as button 36 on acoustic pinger 38 illustrated in the diving sequence illustration of FIG. 6.

Figure 4:
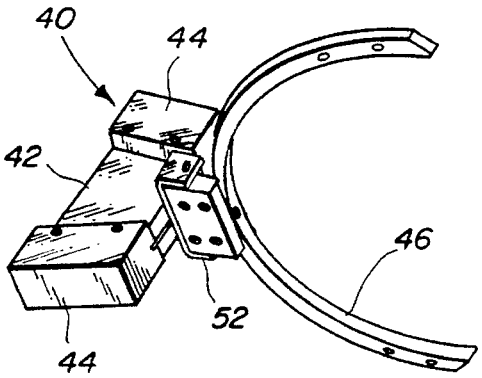
FIG. 4 is an isometric view of the bite plate, mouthpiece and grabber assembly utilized in the method of the present invention.

U.S. Pat. No. 4,444,425 issued to inventors Miller and Bowers and entitled "Cylindrical Object Recovery Device" and U.S. Pat. No. 4,445,719 issued to inventors Miller and Bowers and entitled "Release Mechanism for a Cylindrical Object Recovery Device" are hereby incorporated by reference in their entirety. The attachment and release mechanisms illustrated in these two patents may be adapted for utilization by a beluga whale in the performance of the process of the present invention. In order to adapt these devices for use by beluga whales, mouthpiece or bite plate 40 as illustrated in FIG. 4 is used in conjunction with the attachment and release mechanisms described and illustrated in detail in the previously mentioned patents. The bite plate 40 attaches to the recovery apparatus 46 by attaching to release mechanism 52 as can be readily appreciated by referring to the two previously mentioned U.S. Patents in conjunction with FIG. 4 of this application. The bite plate 40 is comprised of a ¼" thick trapezoidal piece of PVC 42 that is 8" wide in the front, 11" wide at the base, and 7" long. The PVC is first covered with a ¼" thick piece of neoprene rubber and then with a 1/16" piece of Buna-N. A 3-½" thick piece of 22 lb/ft$^3$ syntactic foam 44 for floatation is attached on both sides of the bite plate 42.

Figure 5:
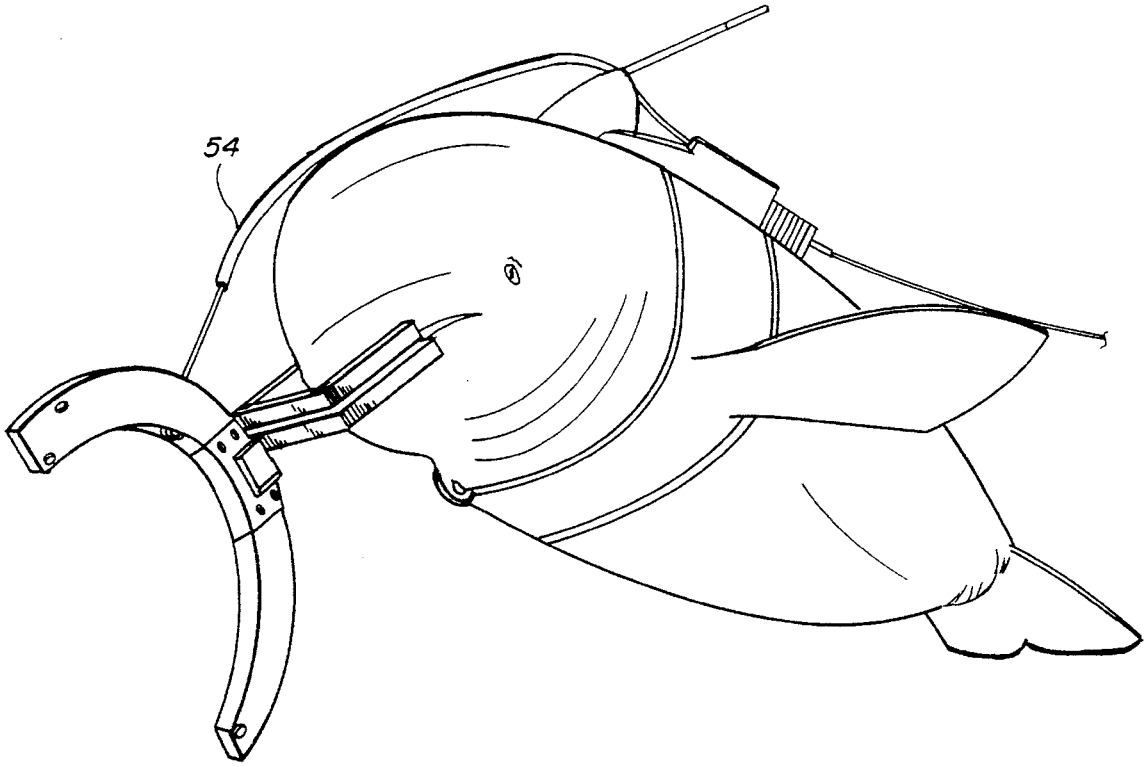
FIG. 5 is an illustration of a beluga whale carrying the mouthpiece and grabber assembly of FIG. 4 in the performance of the method of the present invention.

The beluga whales in accordance with the process of the present invention are initially trained to carry small markers and lightweight object grabbers and initially primarily in shallow water. As the whales become proficient at carrying and deploying against object simulators, more complicated and heavy grabbers are used until the whale's confidence grows and his reliability is increased such that he can use the bite plate 40 and grabber 46 illustrated in FIG. 4. As is illustrated in FIG. 5, a lift line 54 may be attached by suitable means to the attachment device 46 for actual torpedo recovery. When the whale's surface and near-surface tagging becomes reliable, large targets to be tagged may be gradually lowered to the bottom of the area of water. As bottom tagging progresses and shallow-water recoveries are successfully effected, the whales are then conditioned to tag larger targets at increasingly greater depths and increasingly greater distances from their holding pens. Each whale's boat following behavior is gradually extended to prepare it for swimming and working at greater depths and longer ranges.

As briefly mentioned above, when too much stress is exerted on the animals by too rapidly extending the boat-following distance, the animals may either swim back to their pens or dive or forage for fish. These avoidance behaviors may be eliminated by masking the whales with a mask 49 to fit over the whale's melon and mouth. The mask 49 may be hooked with elastic straps onto the harness 30 as is illustrated in FIG. 1.

Figure 2:
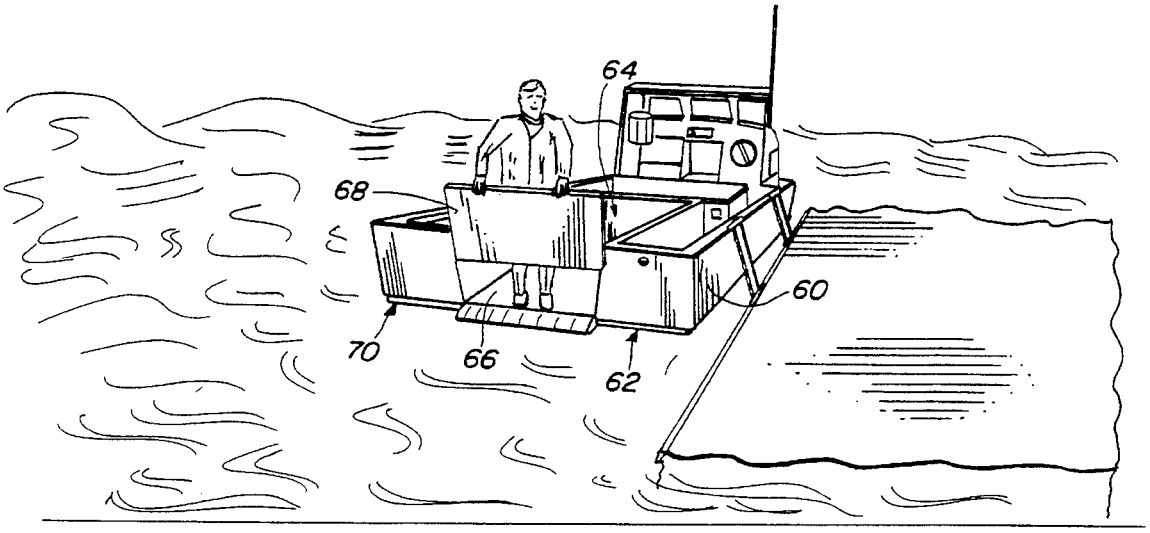
FIG. 2 is an isometric view of a transport beaching boat suitable for the use in the method of the present invention.

The whales are also trained and conditioned to beach themselves onto floating platforms such as platform 24 illustrated in the floating pen of FIG. 3. For transporting the animals over large distances, the whales are conditioned to beach themselves onto a modified 30-foot Radon craft as is illustrated in FIG. 2. The Radon craft 60 has been modified such that the engine is located amidship and the stern area 62 is extended three feet. Further, a 4-foot wide, 13-foot long box compartment 64 is built into the craft having a built-in ramp 66 at the bottom of the compartment 64 approximately six inches above the waterline. The ramp 66 may be made of smooth fiberglass to facilitate the animal's entry into the craft 60 and a sliding transom gate 68 is built into the craft's transom 70 to allow unimpaired access to the water.

As beluga whale conditioning proceeds, and as the whales are required to travel greater distances away from their pens they may become more difficult to handle, tending to shy away from their work boat or tending to swim back towards their pens. Upon this occurrence, it may be beneficial to delete the tow line 54 to reduce the drag forces exerted by it. Thus work at longer distances and greater depths may be accomplished. Additionally, as briefly mentioned above, the flotation device 34 may be added to the whale's harness which serves to discourage the animal from diving and motivates it to swim on the surface near the stern of the boat where drag on the float is minimal. It has been discovered that this restricting float 34 enables the animal's handlers to exert a great deal more control and thus helps to complete the development of boat-following and diving behaviors. During diving conditioning procedures, the flotation device 34 is removed and then reattached at the end of the dive. For deployment to the work site, the beluga whales are trained to slide out of the water into the Radon work boat 60 through the transom gate area 68. When the diving performance and boat-following behaviors have been properly conditioned, line-carrying behaviors to condition the animal to carry line 54 may be renewed.

In order to condition the beluga whales to detect and locate non-pingered targets for attachment of the attachment device 46 thereto, the following conditioning and training procedures are carried out. First the whales are conditioned to report the presence or absence of small metallic shapes of only a few inches in diameter. Those sonar targets are presented in combination and paired with a positive response device and no target trials are paired with a negative response device. Gradually the whales are trained to report a target by pumping the positive black painted device located to the left of a work station. A white painted device on their right side is used to signify a no target condition. Color and spacial orientation cues of the reporting hardware aid in training that detection task. The report devices may be semi-circular 6" plastic hemispheres mounted from a pen or boat a few inches above the water surface four feet apart. That distance provides adequate separation to enable the animals to avoid accidental contact during trials. A low frequency acoustic cue is used to command the animals to search. Gradually, the animals learn to echolocate around the 360° perimeter of the work station and then report by nudging the appropriate device with their melon.

During early training the animals may see and/or hear the targets enter the water but as conditioning progresses and the targets are moved further away and deeper the only method of detection is through echolocation. By using food reinforcement the animals gradually learn to echolocate on each and every trail and to detect at greater and greater ranges. As echolocation reliability improves, target sizes are increased and sequentially hardware carrying and attachment to those passive shapes are conditioned with marking and range extension being conditioned out to several hundred yards and to depths of over 1000 feet.

Thus, the beluga whale recovery system is comprised of a trained beluga whale that performs the following behaviors. Upon command, the whale is trained to beach itself onto a floating platform or modified boat such as Radon boat 60. The whale then allows itself to be transported on the above mentioned platform or boat to the area of water to be searched. The whale is then off loaded from the floating platform or modified boat 60 and is commanded to follow either that modified boat 60 or a smaller boat (not shown) to the work area and then returns. Upon command, the beluga whale is trained to accept the mouthpiece 40 with the associated attachment hardware 46 and tow line 54. Then, utilizing its acoustic homing capabilities, the animal is trained to locate a pingered or non-pingered cylindrical object on the ocean floor or in the water column as has been previously described. Thereupon, the animal is trained to dive down and attach the attachment hardware 46 to the cylinder. The attachment device 46 grabs the cylinder and releases the mouthpiece which the beluga whale then returns to the boat and then receives a reward of fish. The line that is now secured to the target or cylinder by the attachment device 46 is transferred from the work boat to a recovery boat for lift operations such that the cylinder or target may be lifted to the surface or, alternatively, may be buoyed off for later recovery. The beluga whale is then commanded to beach itself upon the Radon boat 60 or may be boat-followed back to its floating pen or to another recovery site.

Obviously many modifications and variations of the present invention are possible in the light of the above teachings. It is therefore to be understood that within the scope of the appended claims the invention may be practiced otherwise than as specifically described.

What is claimed is:

1. A method of locating and attaching recovery hardware to an underwater object comprising the steps of:

training a beluga whale to carry in its mouth said recovery hardware for attachment to said underwater object;

training said beluga whale to use its innate acoustic location ability to detect the location of said underwater object;

training said beluga whale to dive in the water and to detect, locate and attach said hardware to said underwater object;

deploying said beluga whale to an area of water to be searched;

commanding said beluga whale to dive, detect, locate and attach said hardware to said underwater object.

2. The method of claim 1 wherein:

said underwater object comprises a non-pingered underwater object.

3. The method of claim 1 further comprising the step of:

training said beluga whale to beach himself on a boat having beaching capabilities such that said beluga whale can be deployed to said area of water to be searched.

4. The method of claim 1 wherein said recoverer hardware includes means for attachment to said underwater object and a lift line connected to said means for attachment.

* * * * *